Sept. 11, 1956   L. O. CARLSEN ET AL   2,762,220
MACHINE FOR TESTING OR FORMING GEARS
Filed Aug. 3, 1953   6 Sheets-Sheet 2

FIG. 2

INVENTORS
LEONARD O. CARLSEN
THEODORE H. PECK
BY Richard W. Treverton
ATTORNEY

Sept. 11, 1956     L. O. CARLSEN ET AL     2,762,220
MACHINE FOR TESTING OR FORMING GEARS
Filed Aug. 3, 1953     6 Sheets-Sheet 3

INVENTORS
LEONARD O. CARLSEN
THEODORE H. PECK
ATTORNEY

Sept. 11, 1956  L. O. CARLSEN ET AL  2,762,220
MACHINE FOR TESTING OR FORMING GEARS
Filed Aug. 3, 1953  6 Sheets-Sheet 4

*INVENTORS*
LEONARD O. CARLSEN
THEODORE H. PECK
BY Richard W. Treverton
*ATTORNEY*

Sept. 11, 1956   L. O. CARLSEN ET AL   2,762,220
MACHINE FOR TESTING OR FORMING GEARS
Filed Aug. 3, 1953   6 Sheets-Sheet 6

INVENTORS
LEONARD O. CARLSEN
THEODORE H. PECK
BY Richard W. Treverton
ATTORNEY

United States Patent Office 2,762,220
Patented Sept. 11, 1956

2,762,220

MACHINE FOR TESTING OR FORMING GEARS

Leonard O. Carlsen, Rochester, and Theodore H. Peck, Irondequoit, N. Y., assignors to The Gleason Works, Rochester, N. Y., a corporation of New York Application August 3, 1953, Serial No. 371,755

21 Claims. (Cl. 73—162)

The present invention relates to a machine for running gears in mesh for testing them, or for finish forming their tooth surfaces by lapping, burnishing or the like. Certain parts of the machine are also applicable to apparatus for other kinds of gear forming, such for example as gear cutting and gear grinding.

The machine comprises a frame on which there are adjustably mounted supports for rotatable spindles for the gears that are to be run together. One support is pivoted to the frame about an axis parallel to its spindle, so that when the gears are running in metal-to-metal contact, there may be a relative motion of the two supports to accommodate any eccentricity or tooth spacing error in the gears. This motion may be measured by means of indicating and recording devices associated with the machine. When the gears are to be run on fixed centers the pivoted support must be held solidly to the frame. For this purpose the invention provides a pair of aligning parts, one on the frame and one on the pivoted support, a pair of clamp members adapted to engage the opposite sides of both aligning parts, and means to actuate the clamping members between a position wherein they are effective to hold the support rigidly to the frame and a position wherein they free the support for pivotal motion.

Each spindle is rotatable on a pair of anti-friction bearings disposed in bores in the supports. Each bearing has a set of rolling elements, preferably balls, rolling in inner and outer races, the inner race preferably being integral with the spindle and the outer race being mounted in the bore of the support. In order to accurately adjust the preload of the bearings after assembly, the invention provides a pair of sleeves in the bore that are screw-threaded together and have their outer ends respectively abutting the outer races, and means adjustable on the support and engageable with one sleeve for rotating the latter relative to the other sleeve. In this way the sleeves may be adjusted to force the outer races apart until the bearings are preloaded to the desired amount.

For mounting a gear on the spindle there is a chuck means including a rod extending through the spindle and a means effective between the spindle and the rod for moving the latter in one direction. According to one aspect of the invention the last-mentioned means comprises a first abutment on the spindle and a second abutment on the rod, and a pair of elements connected to each other for relative movement to engage said abutments and move the second abutment relative to the first in the direction opposite to said one direction, said elements being mounted on the support for movement thereon as a unit in a direction axial of the spindle. By this arrangement the force applied to move the rod axially is not transferred to the spindle bearings.

An alternate chuck actuating arrangement provided by the invention includes a member screw-threaded to the spindle for effecting axial motion of the rod, a rotatable actuating member for said threaded member, said members having interengaging ratchet formations thereon, yieldable means holding said members engaged, said ratchet formations being separable upon rotation of said actuating member in one direction by yielding of said means when the load on said rod exceeds a predetermined value, and releasable means for locking the spindle against rotation in the support. With this arrangement the spindle is locked prior to chucking. Then the actuating member is rotated, thereby moving the rod within the spindle to effect chucking. The torque applied by the operator to the actuating member is limited to that at which the yieldable means will allow the ratchet formations to separate. In any case the torque exerted is not transferred as an axial load on the spindle bearings, but is transmitted as a torque from the spindle to the support through the releasable locking means.

Another feature of the invention concerns the spindle drive. In the preferred embodiment of the invention the one of the gear carrying spindles, referred to as the drive spindle, is power driven, while the other or driven spindle is rotated by the gears being tested or formed and has associated with it a brake means, preferably an electric generator, for imposing a load on the gears. According to the invention there are upper and lower motor supports disposed below the drive spindle and pivoted to the frame, an adjustable length connector pivoted to each support and forming with the supports and the frame a parallelogram assembly, a motor driven shaft journaled on each support, aligned pulleys on the shafts and an endless drive belt connecting them, aligned pulleys on one shaft and on the drive spindle and a second belt connecting them, and means for raising and lowering the supports to thereby respectively declutch and clutch the second belt. With this arrangement it is only necessary for the operator to actuate a single lever connected to the last-mentioned means in order to simultaneously disconnect the drive spindle from both motor driven shafts.

In order that the drive spindle may be operated over a very wide range of speeds one of the motor driven shafts preferably is a high-speed shaft, and the other, driven by a separate motor, a low-speed shaft. According to another aspect of the invention an electromagnetic clutch is arranged between the low-speed shaft and its driven motor, and, preferably, a second clutch is arranged between the high-speed motor and its shaft. A means is provided whereby each clutch is engaged simultaneously with its motor and whereby the clutch of the low-speed motor shaft is partially engaged, to act as a brake, when the high-speed motor is deenergized.

The pulleys on the drive spindle and on the motor driven shafts preferably are of the type having several grooves of differing diameters so that by shifting the belts various spindle speeds can be obtained for a given motor shaft speed, this arrangement being a well-known type of variable speed transmission. An electric generator for braking the driven spindle is connected to the latter by a similar variable speed transmission, and there is the danger that the generator may be driven at an excessive speed, which would result in its being damaged or destroyed, if the high-speed motor is run while the several belts are arranged over the pulleys to provide a very high driven spindle speed. To eliminate this danger a means is provided to deenergize the drive motor when the generator output voltage exceeds a predetermined value.

The foregoing and other objects and advantages of the invention will appear from the following description made with reference to the drawings, wherein:

Fig. 13 is an axial sectional view, similar to Fig. 5, but showing a spindle with a modified chuck actuating means; and, Fig. 14 is a detail elevation of several of the parts shown in Fig. 13.

Figure 1:
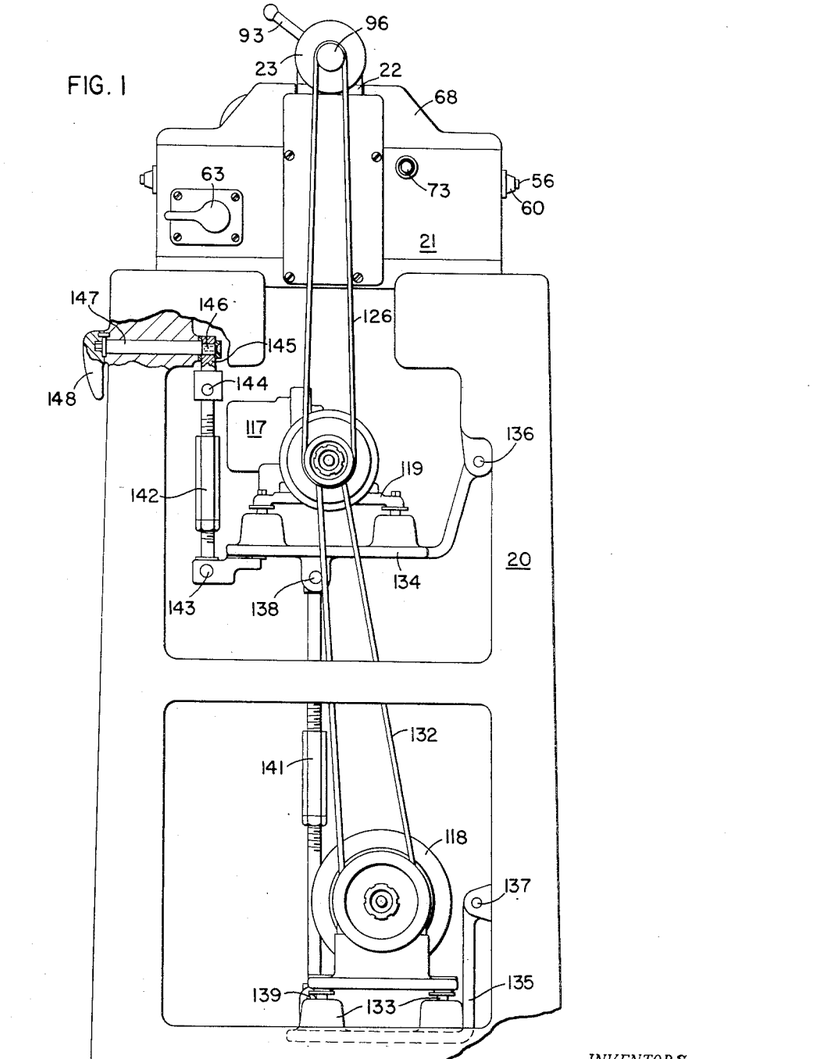
Fig. 1 is side elevation of the machine.
Figure 2:
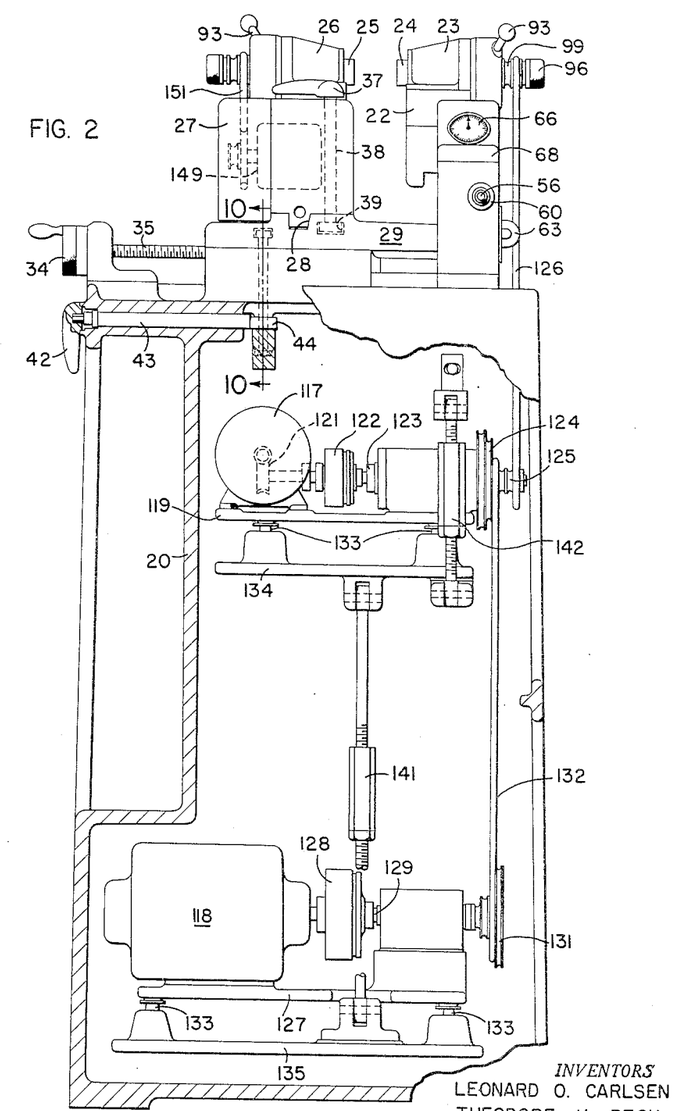
Fig. 2 is a front elevation, partly in vertical section, of the machine when arranged for running gears together on parallel axes.
Figure 3:
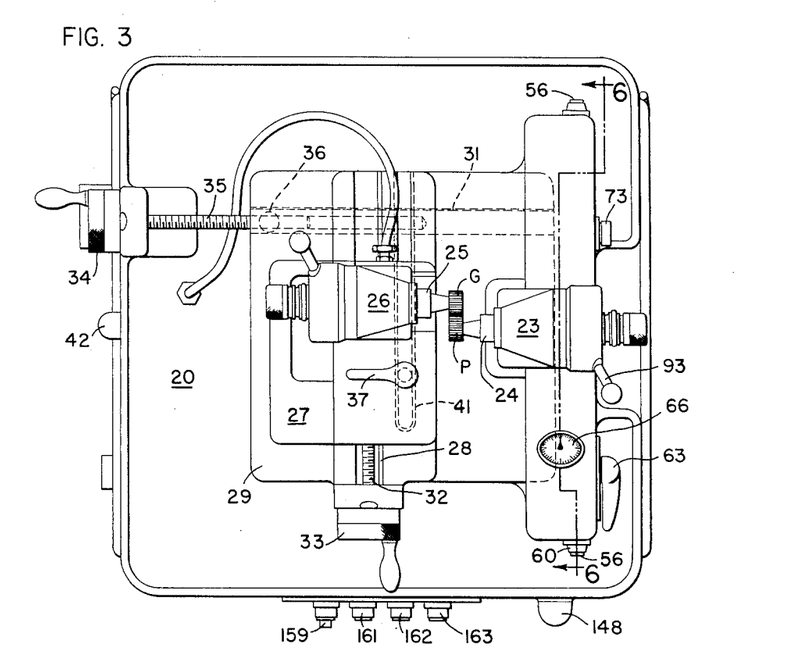
Fig. 3 is a plan view of the machine arranged as shown in Fig. 2.

Referring first to Figs. 1, 2 and 3, the machine has a frame 20 on which is mounted a base 21. To this base is pivoted a bracket 22, and to the latter is secured a housing 23 which constitutes the support for the drive spindle 24 for a gear or pinion P to be tested or formed on the machine. The other such gear G is mounted on a driven spindle 25 that is journaled in a housing 26 which preferably is identical with housing 23. Housing 26 is secured to a column 27 that is adjustable in a direction perpendicular to the axes of spindles 24 and 25 along a way 28 upon a sliding base 29. The latter is adjustable, in a direction parallel to the spindle axes, along a way 31 on the upper surface of the frame.

The adjustment of column 27 along way 28, to accommodate gears P and G of different diameters and to adjust their center-to-center distance, is effected by turning a screw 32 that is journaled for rotation in the slide 29 and is threaded to a nut, not shown, that is fixed to the column. The screw may be turned by means of a knob 33 which preferably has calibrations registering with suitable markings on the adjacent surface of the slide 29. A similar knob 34 is secured to a screw 35 that is journaled for rotation in the base and is threaded to a nut 36 fixed to sliding base 29. By turning knob 34 the base 29 may be adjusted to properly position the gears G and P in the direction of their axes.

Figures 9, 10, 12:
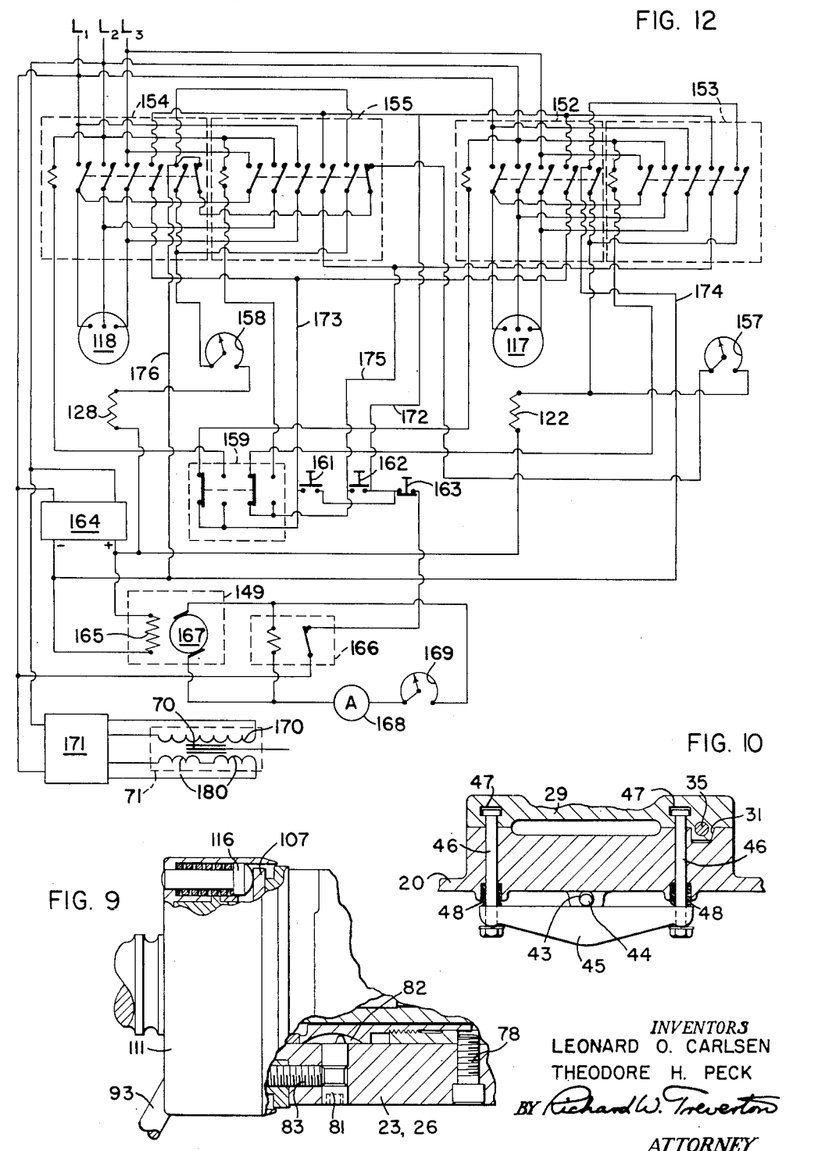
Fig. 9 is a fragmentary elevational view, partly in section, of the spindle support shown in Fig. 5.
Fig. 10 is a sectional view in the plane designated by line 10—10 in Fig. 2.
Fig. 12 is a wiring diagram of the machine.

After the column 27 has been adjusted on the sliding base, it may be clamped thereto by turning a handle 37 that is secured to a clamp screw 38, the latter being threaded to a clamp nut 39 that is slidable in a T-slot 41 in the sliding base. Similarly the sliding base may be clamped in its adjusted position on the frame by turning a handle 42 that is secured to a rod 43, which, as shown in Figs. 3 and 10, is journaled in the frame and has an eccentric end 44 bearing on a draw bar 45. The ends of the latter are engaged with nuts on clamp bolts 46 that extend through the frame 20 and have headed upper ends engaged in T-slots 47 that are formed in the sliding base parallel to the way 31. Springs 48 exert pressure to retain the sliding base in sliding contact with the frame when the clamp means are released.

Figure 7:
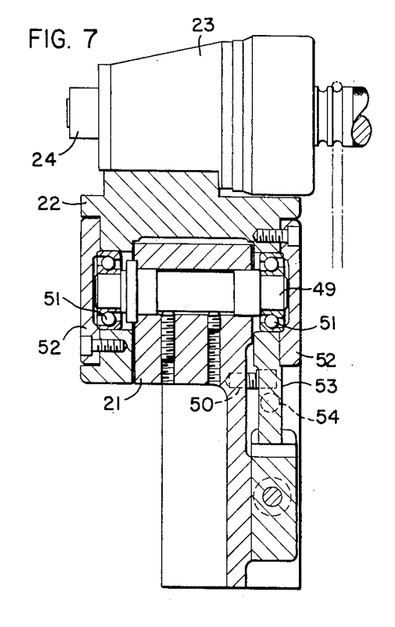
Fig. 7 is a sectional view taken in the plane indicated by line 7—7 in Fig. 6.

As shown in Fig. 7 the pivoted connection of bracket 22 to base 21 includes a shaft 49 secured to the base and supporting the inner races of ball-bearings 51. The outer bearing races are retained in the bracket 22 by plates 52 whose dimensions are such that during assembly the bearings are pre-loaded, thereby eliminating lost motion between the bracket and the base both axially and radially of the bearings.

Figure 6:
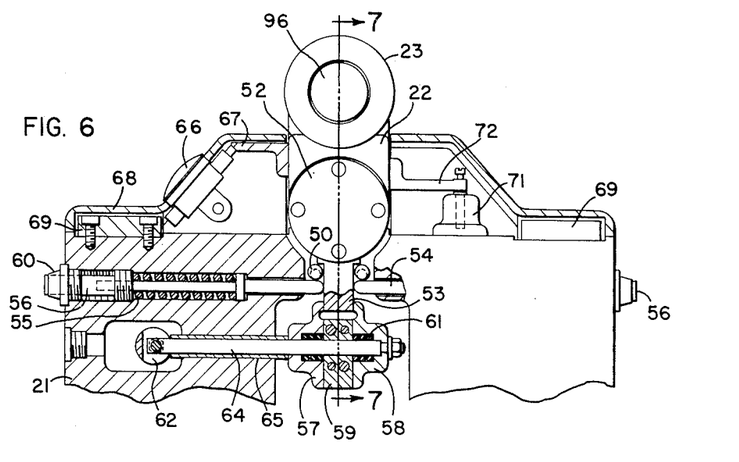
Fig. 6 is a fragmentary view partly in vertical section and partly in side elevation, as indicated by section line 6—6 in Figs. 3 and 4.

The bracket 22 has an aligning part 53 depending therefrom as shown in Figs. 6 and 7. When gears P and G are run without backlash, the spindle 24 and its support 22, 23 must pivot about shaft 49 to accommodate errors in the gears of eccentricity, tooth spacing and tooth profile shape. For such operation part 53 is engaged by one or the other of spring-pressed plungers 54 to hold the gears in metal-to-metal contact. Either plunger can be made effective or ineffective by compressing or releasing its spring 55 by means of an adjusting screw 56. Which plunger should be made effective depends upon the adjustment of the column on sliding base 29, i. e. on which side of pinion P the gear G is mounted. Each screw 56 has its shank protruding through a screw stop 60, the amount of protrusion indicating the degree of compression of spring 55 and the shank preferably being calibrated in terms of spring pressure. Stop pins 50 mounted on the base 21 limit the pivot motion of bracket 22.

When the gears P and G are to be run with sufficient backlash so that no pivot motion about shaft 49 is needed, part 53 may be clamped in centered position by members 57 and 58 which also engage an aligning part 59 on the frame. Members 57 and 58 are normally urged apart, to free part 22, 53 for pivotal motion, by springs 61. They are clamped together, in the position shown in Fig. 6, by an eccentric 62 that is manually turned by means of its handle 63. The eccentric is rotatably carried by a rod 64 secured to clamp member 58 and it acts upon a tube 65 that is telescoped over the rod and is secured to clamp member 57. Both the tube and the rod are supported for free axial motion in frame 21.

When the clamp means are released and the gears are running without backlash, the pivotal motion of the bracket 22 about the axis of shaft 49, resulting from errors of eccentricity, tooth spacing and tooth profile shape, is shown by an indicator gage 66 whose actuating stem engages an arm 67 carried by the bracket. The gage is mounted on a cover 68 that is secured to the base 21 by suitable means which include keys 69. For making a record of the pivotal motion there is provided an electro-magnetic transducer 71 mounted on base 21, the transducer preferably comprising a variable differential transformer that has its movable core 70 adapted to be moved by a second arm 72 carried by the bracket. A suitable electrically operated record unit 171, Fig. 12, is connected to the transducer by means which include the electric socket 73, Figs. 1 and 3.

Figure 5:
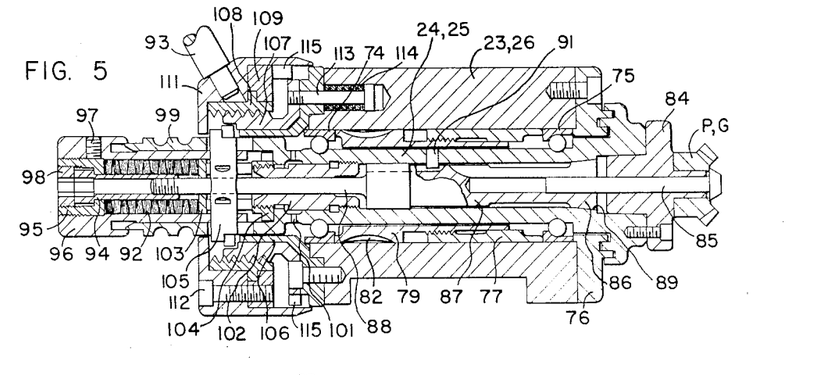
Fig. 5 is an axial section view through the spindle for one of the gears and the support for the spindle.

Referring to Figs. 5 and 9, each housing 23, 26 has a bore receiving the outer races 74 and 75 of ball-bearings whose inner races are formed in the spindle, 24 or 25. The race 75 is confined between a retainer 76 and a sleeve 77 that is secured in the bore of the housing by a screw 78. A sleeve 79 abuts race 74 and is screw-threaded to sleeve 77. In order to pre-load the bearings to the degree necessary to eliminate axial and radial lost-motion, the sleeve 79 is rotated relative to sleeve 77 by turning a pin 81 that has an eccentric tooth engaging in one of the inter-tooth spaces of teeth 82 that are formed around sleeve 79. After such bearing adjustment the pin 81 is clamped by a set screw 83.

For securing a gear, P or G, to the spindle, an arbor 84 and a draw pin 85 are provided. The pin is gripped and drawn inwardly relative to the spindle by jaws 86 of a collet 87. When the integral draw rod 88 of the collet is drawn rearwardly (to the left in Fig. 5) the outer faces of the jaws 86 engage and are contracted by tapered bore 89 in the spindle. The collet is held against rotation in the spindle by a key 91. The draw rod is urged rearwardly (to the left in Fig. 5) by Belleville springs 92 to chuck the gear, and forwardly, for dechucking, by the operator swinging a lever 93 to remove the spring pressure from the collet and move the latter forwardly. The effective length of the draw rod is adjusted by rotating a nipple 94 to which it is screw-threaded, the nipple being rotatable in a fitting 95. This fitting in turn is screw-threaded to spring case 96 to enable adjustment of the compression of the springs. After this compression adjustment the fitting 95 is clamped to the spring case by a set screw 97, and after adjustment of nipple 94, it is clamped to the fitting 95 by a set screw 98. The spring case telescopes within a tubular pulley 99 which constitutes an extension of the spindle, being secured to the latter by face clutch teeth 101, a threaded nipple 102 and a nut 104. A short sleeve 103 is interposed between the springs 92 and the adjacent end face of this nipple 102.

The arrangement is such that the springs act rearwardly on the draw rod 88, to the left in Fig. 5, because parts 94, 95, 96 and 98 move as a unit with the draw rod after they have been adjusted; and the springs react against the spindle through sleeve 103. The sleeve 103, pulley 99, nipple 102 and nut 104 constitute a unit with the spindle.

Figure 11:
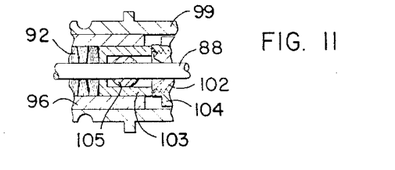
Fig. 11 is a fragmentary axial sectional view through the spindle support shown in Fig. 5, in a plane at right angles to the latter.

The means actuated by lever 93 are so arranged that during dechucking the spring force is not transmitted to the bearings. For this purpose a pin 105 is fitted into aligned openings in the opposite sides of spring case 96. The pin, shown in Figs. 5 and 11, extends through but does not engage the ends of aligned elongated openings in the opposite sides of pulley 99 and it likewise extends through the sleeve 103, the latter being cut away so that the pin can move freely relative to it in the direction of the spindle axis. The pin itself has notches cut in its sides to clear edges of the cut-away part of the sleeve and it also has a transverse opening through which the draw rod 88 passes.

A tubular part 106 is secured to the housing in coaxial relation to the spindle, and slidable axially on this part 106 is a member 107 which is screw-threaded to an externally flanged nipple 108. The latter is clamped between a ring 109 and the cap 111 to which the lever 93 is secured, members 109 and 111 being clamped together by screws 112. A plunger 113 extends from the screw-threaded member 107 into a bore in the housing and thereby prevents rotation of the member. A light spring 114 acts on the plunger to normally hold this member 107 in its limit position to the right, in abutment with the flange of tubular part 106.

As will appear from Fig. 5, when lever 93 is turned in a direction to screw part 108 further onto part 107, the inwardly directed flange of cap 111 will abut the ends of pin 105, urging it to the right. However such motion of the pin does not at first take place because the pin must move as a unit with the spring case 96 and draw rod 88, and their motion to the right is resisted by the relatively heavy springs 92. Accordingly the part 107 moves to the left, against the relatively light resistance of spring 114 until it (107) abuts the external flange on pulley 99. Thereafter the continued turning of lever 93 causes the pin 105, and the draw rod, to be moved to the right relative to the spindle, thus moving the collet 87 forwardly and thereby dechucking the gear P or G. It will be noted that during this action the force of the heavy springs 92 is not transmitted to the spindle bearings. Only the relatively light load of the springs 114 is transmitted to the bearings.

In effect, the parts 107, 108, 111 constitute an axially floating clamp which serves to shift the pin 105 relative to the pulley. In order to limit the relative turning motion of the clamping parts to the degree necessary to effect chucking and dechucking, cooperating stop shoulders 115 are provided on the ring 109, which turns as a unit with the lever 93, and on the member 107. In order to eliminate rattle of the clamping parts when the spindle is rotating at high speed, the cap 111 is provided with the spring pressed plunger 116, shown in Fig. 9, which bears on the member 107. The plunger is preferably made of a thermo-plastic or other non-metallic, vibration-deadening material.

Referring again to Figs. 1 and 2, a low-speed motor 117 and a high-speed motor 118 are provided for driving spindle 24. Motor 117 is mounted on a base 119 and through reduction gearing 121 and an electro-magnetic clutch 122 drives a shaft 123. The latter carries pulleys 124 and 125 and is journaled for rotation in a bearing support mounted on base 119. Pulley 125 has two grooves that are aligned respectively with two grooves on pulley 99 on drive spindle 24. The two pulleys are connected by a flexible belt 126. By shifting the belt from one aligned pair of grooves to the other the spindle can be driven at a speed either approximately equal to or greater than that of the shaft 123.

The high-speed motor 118 is mounted on a base 127 and through a coupling 128 drives a shaft 129 that is journaled for rotation in a bearing support that also is mounted on the base. On shaft 129 is a pulley 131 having grooves of four different diameters that are aligned with four different diameter grooves in pulley 124 on shaft 123. The flexible belt 132 around these pulleys may be shifted from one pair of aligned grooves to another, to thereby vary the speed of shaft 123 relative to shaft 129. In the drawings the belt is on the largest groove of pulley 131 and the smallest of pulley 124 so that shaft 123 will be rotated at a speed substantially greater than that of shaft 129.

The motor bases 119 and 127 are secured respectively to supports 134 and 135 by means of vibration isolators 133. These supports are pivoted at 136 and 137, respectively, to the frame 20. The supports are also pivotally connected, at 138 and 139 to the upper and lower ends of a turnbuckle 141 by means of which the tension of belt 132 may be adjusted. However the pivots 136—139 are so arranged that the frame, the two motor supports and the turnbuckle form an approximate parallelogram assembly, so that the tension of belt 132 is little affected by the aforementioned pivotal motion of supports 134 and 135. A turnbuckle 142 for adjusting the tension of belt 126 is pivoted at 143, at its lower end, to support 134 and at 144 at its upper end to a connecting link 145. The latter is supported by an eccentric 146 on the inner end of a rod 147. This rod, provided with handle 148, is mounted in the frame for rotation through slightly more than 180°. When the handle is turned upwardly from the position shown to a position slightly beyond the vertical the eccentric holds the turnbuckle 142 and the support 134 in a raised position, wherein the belt 126 is slack or declutched. Thus by operation of handle 148 the spindle 24 can be clutched to or declutched from the motors. When declutched the spindle can be freely turned by hand for hand testing to feel any irregularities in the gears.

For providing a load on the gears being run together, a brake in the form of an electric generator 149, Fig. 2, is mounted in the column 27, and is connected to the driven spindle 25 by a drive belt 151. The pulley on the generator preferably has grooves of different diameters aligned with the two grooves on the spindle pulley, so that by shifting the drive belt the generator can be driven at different speeds relative to the spindle. The generator is adjustable within the column by suitable means, not shown, to thereby adjust the tension on belt 151. The means for controlling the generator, to vary the brake load, will be described in connection with the wiring diagram, Fig. 12.

In this diagram $L_1$, $L_2$ and $L_3$ represent the main leads of a three-wire alternating current supply system. The low-speed motor 117 has a forward controller 152 and a reverse controller 153, while the high-speed motor 118 has a forward controller 154 and a reverse controller 155. The low-speed electro-magnetic clutch 122 is controlled by a rheostat 157, and the high-speed clutch 128 by a rheostat 158. There is a double-throw switch 159 for selecting either the high or the low speed motor, and push-button type forward, reverse and stop switches 161, 162 and 163, respectively. Also included in the electrical system are a rectifier 164 for supplying direct current to excite the field windings 165 of generator 149 and to energize the clutches 122 and 128, an overvoltage relay 166 whose winding is energized by the armature 167 of the generator, an ammeter 168 to indicate the output of the generator, and hence its braking effort on the driven spindle, and a rheostat 169 to vary such braking effort. There is also shown an amplifier and recorder unit 171 for supplying a voltage to the primary winding of the transducer 71 and for amplifying and recording the output voltage from the transducer's opposed secondary coils 180.

Before operating the machine the gears to be run together are chucked on the drive and driven spindles and by the various machine adjustments are brought into the desired running position; and the drive belts 126 and 132 are adjusted to provide a drive of the desired ratio. To operate the low-speed motor in forward direction the start switch button 161 is momentarily depressed. This establishes a circuit from lead L₁ through the now closed contacts of the overvoltage relay 166, the normally closed stop switch 163, the start switch 161, the left outside contacts of switch 159 and the winding of controller 152 to lead L₂. As a result the contacts of controller 152 are closed, thereby connecting leads L₁, L₂ and L₃ directly to the motor 117, causing it to run in a forward direction. Also a holding circuit is established which shunts the switch 161 so that opening of this switch now has no effect, the shunt being from switch 163, lead 172, a now closed contact of controller 152 and lead 173 to the left contact of switch 159.

Upon energization of the controller 152 the clutch 122 is activated so that the motor 117 will drive the shaft 123 and the spindle 24. The activating circuit is from the positive terminal of rectifier 164 through the clutch 122, the now closed right contact of controller 152 and lead 174 to the negative terminal of the rectifier. The spindle 25, which is driven by the pair of gears that is being run together, is braked by the generator 149, the braking effort being adjustable by rheostat 169 and indicated by ammeter 168.

The controllers 152 and 153 are interlocked (as are also controllers 154 and 155), either mechanically or electrically so that if the contacts of one are closed the contacts of the other are held open even if its winding is energized. Accordingly in order to reverse the motor 117 the stop switch 163 is momentarily opened, thus deenergizing controller 152 and causing its contacts to open. Reverse operation of motor 117 may now be effected by momentarily closing the reverse start switch 162, establishing a circuit from lead L₁ through the contact of overvoltage relay 166, stop switch 163, start switch 162, the right contact of switch 159 (in its left position), and the winding of controller 153 to lead L₂. A holding shunt circuit around the switch 162 is established through lead 172, a contact of controller 153 and lead 175; and the clutch 122 is energized through a direct current circuit including the rectifier 164, rheostat 156 and right contact of controller 153. As before, the circuit for the controller is broken, to stop the motor 117, by momentarily opening switch 163. During reverse operation of the motor the brake system including generator 149, rheostat 169 and ammeter 168 functions the same as during forward operation.

To operate the high-speed motor 118, the selector switch 159 is shifted to the right. Thus, upon closing of forward switch 161, a circuit through forward controller 154 is established to thereby connect leads L₁, L₂ and L₃ to the motor 118. Or, if reverse switch 162 is closed, the circuit for controller 155 is established, so that motor 118 runs in the opposite direction. In either case the clutch 128 is energized through a circuit from the positive terminal of rectifier 164 through the clutch winding, the rheostat 158, a contact of whichever of the two controllers is energized and lead 176 to the negative terminal of the rectifier. The generator will operate, as before, if the belt 151 is installed. However, if the high speed motor is operated when the belts 151, 126 and 132 are so adjusted that the speed of generator 167, and hence also its output voltage, become excessive, or if for any other reason this voltage becomes excessive, the contact of the overvoltage relay 166 will open, thereby breaking the circuit to the motor controllers, so that the machine cannot be operated until the belts are correctly adjusted.

Normally the motor 118 will be deenergized by opening the stop switch 163, but whether by this action or by opening of overvoltage relay 166, the deenergization of controller 154 or 155 causes a circuit to be established from the positive terminal of rectifier 164, through the windings of clutch 122, rheostat 157, the right contacts of controllers 155 and 154, and lead 176 to the negative terminal of the rectifier. This partially energizes the clutch 122 so that the low-speed motor unit imposes a braking effort on shaft 123 to quickly stop the high-speed motor, and the parts driven by it. It will be noted that the braking effect is enhanced when the reduction gearing 121 is irreversible or operates with a large amount of friction when the drive is reversed, i. e. when it is from clutch 122 to the motor 117.

Figure 4:
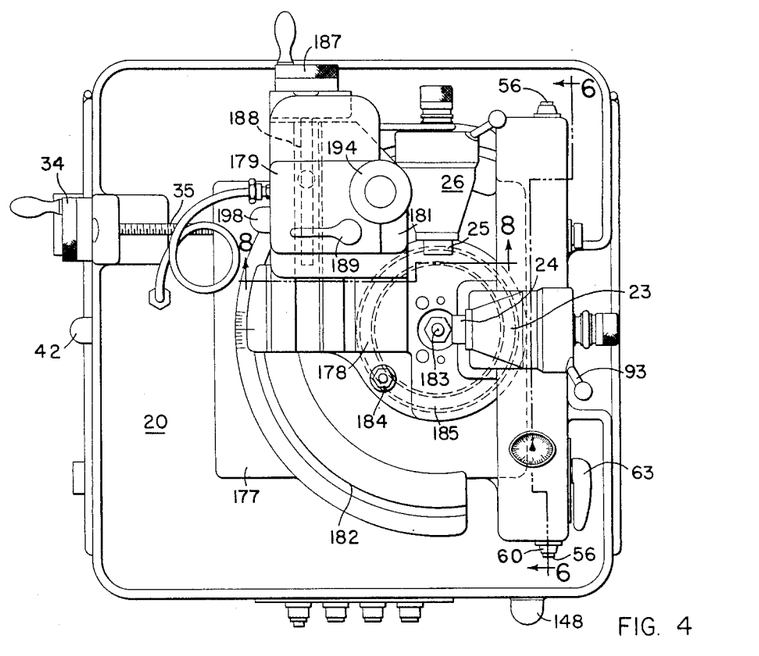
Fig. 4 is a plan view of the machine when arranged for running gears together on intersecting axes.
Figure 8:
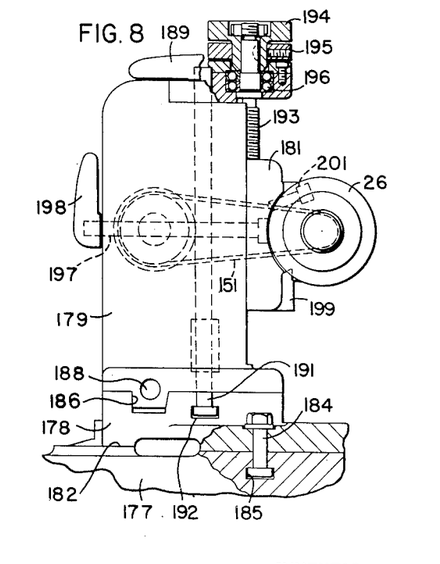
Fig. 8 is a fragmentary elevational view, partly in section, taken as indicated by line 8—8 of Fig. 4.

For running together pairs of bevel or hypoid gears the sliding base 29 and column 27 are replaced by the sliding base 177, swinging base 178, column 179 and vertical slide 181 shown in Figs. 4 and 8, but the same driven spindle and spindle housing unit 25, 26 may be used. Base 177 is adjustable on frame 20 in the same manner as base 29 to vary the position of housing 26 in the direction of the axis of drive spindle 24. Base 177 supports the swinging base 178 for adjustment along arcuate way 182 and about center 183. After such adjustment, which is made to adapt the machine for gears of different shaft angle, the bases 177 and 178 are clamped together by tightening a nut 184 that is threaded to a bolt whose head is engaged in T-slot 185 in the base 177. The column 179 is adjustable along a way 185 on swinging base 178 by turning the calibrated knob 187 of screw 188, just as column 27 is adjustable along way 28 of base 29 by turning knob 33. This adjustment enables the spindle to be brought to various distances from center 183. After this adjustment the column 179 may be clamped to base 178 by turning lever 189. This lever is fastened to a rod that is rotatable in the column and threaded to a screw 191 whose head is engaged in T-slot 192 in the base.

Hypoid adjustment, i. e. adjustment of the offset between the axes of spindles 24 and 25, is effected by moving the slide 181 vertically on column 179 by turning screw 193, the slide moving along a vertical way (not shown) that is provided on the column. The screw 193 has an adjusting knob 194, which, like other adjusting knobs on the machine, has a calibrated dial 195. The screw is journaled in bearing unit 196 for rotation in the column and is threaded to a nut, not shown, that is anchored to the slide 181. After the hypoid adjustment is made the slide is clamped to the column 179 by turning a screw 197 by means of lever 198, the screw threading onto a nut that is received in a vertical T-slot in the slide 181. The spindle housing 26 is secured in place, by means like those employed to secure the housing 23, including a gib 199 and screw 201. Like the column 27, the column 179 may house the electric generator 149 for braking the driven spindle, the generator being adjustable in the housing to enable proper tensioning of its drive belt 151 in any position of adjustment of slide 181.

Figures 13, 14:
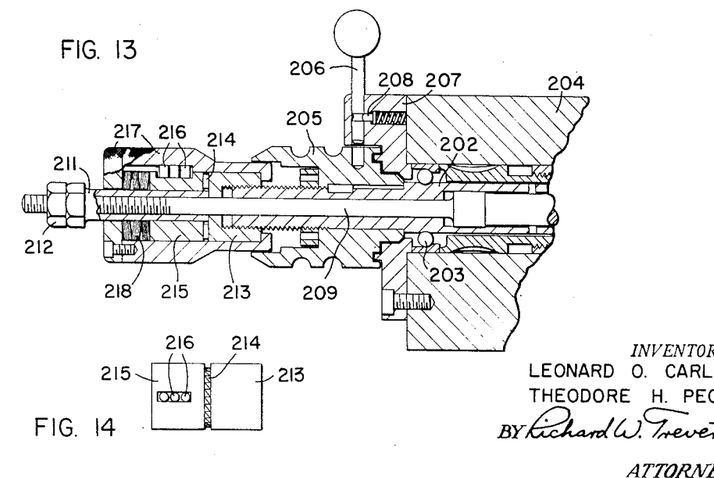

In Figs. 13 and 14 there is shown a modified spindle and spindle housing unit employing an alternative form of chuck actuating mechanism. The spindle itself, designated 202, is journaled on anti-friction bearing means 203 in the housing 204 which, preferably, is interchangeable with housings 23 and 26. A pulley 205 is secured to the spindle by the nut and key shown, and it has a recess adapted to receive the end of a locking pin 206 that is slidable in the bearing retainer 207. The pin is normally held disengaged from the pulley by a spring-backed detent 208, but it may be engaged therewith to lock the spindle when the draw rod 209 of the contractible collet is to be adjusted or actuated. The collet itself may be substantially like that shown at 87 in Fig. 5. It is adjusted by means of a nut 211 that is screw-threaded to it and it is clamped by means of a lock nut 212.

To chuck or dechuck the work the draw rod is moved axially relative to the spindle, respectively to the left or right in Fig. 13, by turning a member 213 that is screw-threaded onto the end of the spindle and that abuts the nut 211. Member 213 has saw-tooth face coupling teeth 214 mating with similar teeth on the face of an annular member 215 that is rotatable on nut 211. Member 215 is keyed by means of a roller 216 to a two-part knurled knob 217 that is rotatable on member 213, the rollers permitting free axial motion of member 215 within the knob. Belleville springs 218 compressed between a flange of the knob and the member 215 normally retain the mating face clutch teeth fully engaged. When the knob 217 is turned in one direction, to dechuck, the clutch teeth act to positively rotate the member 213 as a unit with the knob. However when the knob is turned in the opposite direction, to chuck, the clutch teeth may disengage when the torque applied to the knob becomes great enough to compress the springs 218. The springs are so designed that they will compress enough to allow the member 215 to turn, without turning member 213, when the axial force exerted on the draw rod 209 reaches its design limit. In this way excessive loads on the chucking mechanism are prevented.

Having now described the preferred embodiment of our invention, what we claim is:

1. A machine for running gears together for testing or forming them, comprising a frame, drive and driven spindles for the gears, supports for said spindles mounted on the frame, one support being pivoted to the frame about an axis parallel to the axis of its spindle, said one support and the frame having aligning parts, a pair of clamp members adapted to engage the opposite sides of both aligning parts, and means to actuate said clamp members.

2. A machine according to claim 1 in which there are separately adjustable spring means to resist motion of the pivoted support in each direction, and means to show the magnitude of the pivot motion of the support.

3. A machine according to claim 1 in which the clamp actuating means comprises resilient means for urging said clamps to released position and manually operable means for urging them to applied position.

4. A machine according to claim 1, in which a rod slidable in the aligning part on the frame is joined to one clamp member, a tube telescoped over the rod is joined to the other clamp member, and the manually operable means comprises an eccentric for effecting relative motion of the rod and tube.

5. A machine for forming or testing gears comprising a stationary support having a bore therethrough, a spindle supported in said bore on spaced anti-friction bearings, each of said bearings having a set of rolling elements, an inner race on the spindle and an outer race mounted in said bore, a pair of sleeves in said bore screw-threaded together and having their outer ends respectively abutting the outer races, and means adjustable on the support and engageable with one sleeve for rotating the latter relative to the other sleeve, to thereby force the outer races apart to pre-load the bearings.

6. A machine according to claim 5 in which one sleeve has a plurality of teeth thereon and said means adjustable on the support comprises a rotatably adjustable member having a formation engaging at least one tooth of the sleeve.

7. A machine according to claim 5 in which there is a chuck means, including a rod extending through the spindle, for securing a gear on the spindle, a rotatable screw-threaded member acting between the spindle and the rod for effecting axial motion of the rod relative to the spindle, a rotatable actuating member for said screw-threaded member, said members having interengaging ratchet formations thereon, yieldable means holding said members engaged, said ratchet formations being separable upon rotation of said actuating member in one direction by yielding of said means when the load on said rod exceeds a predetermined value, and releasable means for locking the spindle against rotation in the support.

8. A machine according to claim 5 in which there is a chuck means including a rod extending through the spindle for securing a gear on the latter and a means effective between the spindle and the rod for moving the latter axially in one direction, the last-mentioned means comprising a first abutment on the spindle and second abutment on the rod, and a pair of elements connected to each other for relative movement to engage said abutments and move the second abutment relative to the first in the direction opposite to said one direction, said elements being mounted on the support for movement thereon as a unit in a direction axial of the spindle, whereby there is prevented transfer to said bearings of the load exerted by said means effective between the spindle and the rod.

9. A machine for forming and testing gears comprising a stationary support and a spindle mounted for rotation therein, chuck means, including a rod extending through the spindle, for securing a gear on the spindle, a rotatable screw-threaded member acting between the spindle and the rod for effecting axial motion of the rod relative to the spindle, a rotatable actuating member for said threaded member, said members having interengaging ratchet formations thereon, yieldable means holding said members engaged, said ratchet formations being separable upon rotation of said actuating member in one direction by yielding of said means when the load on said rod exceeds a predetermined value.

10. A machine for forming or testing gears having a stationary support and a spindle mounted for rotation therein, chuck means including a rod extending through the spindle for securing a gear on the latter, and a means effective between the spindle and the rod for moving the latter axially in one direction, the last-mentioned means comprising a first abutment on the spindle and a second abutment on the rod, and a pair of elements connected to each other for relative movement to engage said abutments and move the second abutment relative to the first in the direction opposite to said one direction, said members being mounted on the support for movement thereon as a unit in a direction axial of the spindle.

11. A machine according to claim 10 in which the means effective between the spindle and the draw rod for urging the latter in one direction comprises an axially compressed spring, means for adjusting the compression of the spring, and means for adjusting the rod relative to the spring, the spring and both adjusting means being rotatable as a unit with the spindle and the rod.

12. A machine according to claim 10 in which there is a means to normally hold said elements in such position relative to the support that they are free of said abutments.

13. A machine according to claim 10 in which said elements comprise a first element on the support for motion relative thereto in a direction axial of the spindle, and a second element screw-threaded to the first.

14. A machine according to claim 12 in which the means to normally hold said elements in such position that they are free of said abutments comprises a spring effective between the support and one element.

15. A machine according to claim 13 in which the elements are screw-threaded for relative motion about the spindle axis.

16. A machine for running gears together for testing or forming them, comprising a frame, drive and driven spindles for the gears mounted for rotation on the frame, upper and lower motor supports disposed below the drive spindle and pivoted to the frame, an adjustable length connector pivoted to each support and forming with the supports and the frame a parallelogram assembly, a motor driven shaft journaled on each support, aligned pulleys on the shafts and an endless drive belt connecting them, aligned pulleys on one shaft and on the drive spindle and a second belt connecting them, and means for raising and lowering the supports to thereby respectively declutch and clutch the second belt.

17. A machine according to claim 16 in which the means for raising and lowering the supports comprises an eccentric journaled in the frame, means for turning the eccentric, and an adjustable length connector engaged with the eccentric and pivoted to one support.

18. A machine according to claim 16 in which there is a low-speed motor for the shaft which is most directly connected to the drive spindle, an electromagnetically operated clutch between said motor and shaft, a high-speed motor for the other shaft, and means for simultaneously energizing either the low-speed motor and said clutch, or the high-speed motor, and means effective upon deenergization of the high-speed motor for partially energizing the clutch to cause it to brake the low-speed motor shaft.

19. A machine for running gears together for testing or forming them, comprising a spindle adapted to support a gear, a low-speed motor shaft and a drive motor therefor, a high-speed motor shaft and a drive motor therefor, reduction gearing and a clutch between the first-mentioned motor and the low-speed motor shaft, a clutch between the high-speed motor shaft and its motor, means for selectively energizing or deenergizing either motor and simultaneously engaging or disengaging its clutch, respectively, and means for engaging the clutch of the low-speed motor when the high-speed motor is deenergized, to thereby brake said high-speed motor.

20. A machine for running gears together for testing or forming them, comprising a spindle adapted to support a gear, a low-speed motor shaft and a drive motor therefor, a high-speed motor shaft and a drive motor therefor, reduction gearing and a clutch between the first-mentioned drive motor and the low-speed motor shaft, means for selectively energizing or deenergizing either motor, and for respectively engaging and disengaging the clutch upon energization or deenergization of the low-speed motor, and means for engaging the clutch upon deenergization of the high-speed motor to thereby brake said high-speed motor.

21. A machine for running gears together for testing or forming them, comprising rotatable drive and driven spindles for the gears, an electric generator connected with the driven spindle for braking the latter, means including alternatively employed high and low speed motor drives and a variable speed transmission for operating the generator at different speeds, means to vary the output current of the generator to thereby vary its braking effort, and means effective when the generator output voltage exceeds a predetermined value to deenergize the motor drive then being employed.

References Cited in the file of this patent

UNITED STATES PATENTS

| | | |
|---|---|---|
| 1,909,088 | Bauer | May 16, 1933 |
| 2,111,170 | Condon | Mar. 15, 1938 |
| 2,363,377 | Wrathall | Nov. 21, 1944 |
| 2,399,918 | Garr | May 7, 1946 |
| 2,445,649 | Turner | July 20, 1948 |
| 2,582,408 | Bauer | Jan. 15, 1952 |
| 2,629,468 | Jelinek et al. | Feb. 24, 1953 |
| 2,653,283 | Feldhausen | Sept. 22, 1953 |